June 25, 1963 R. W. KERR 3,095,129
CAR TOP TRUNK LUGGAGE CARRIER
Filed July 7, 1959 2 Sheets-Sheet 1
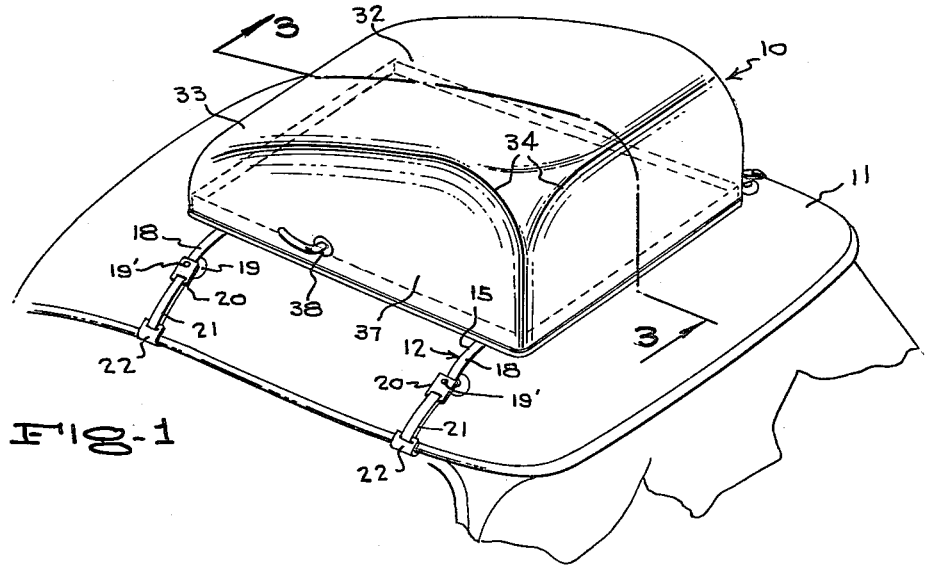
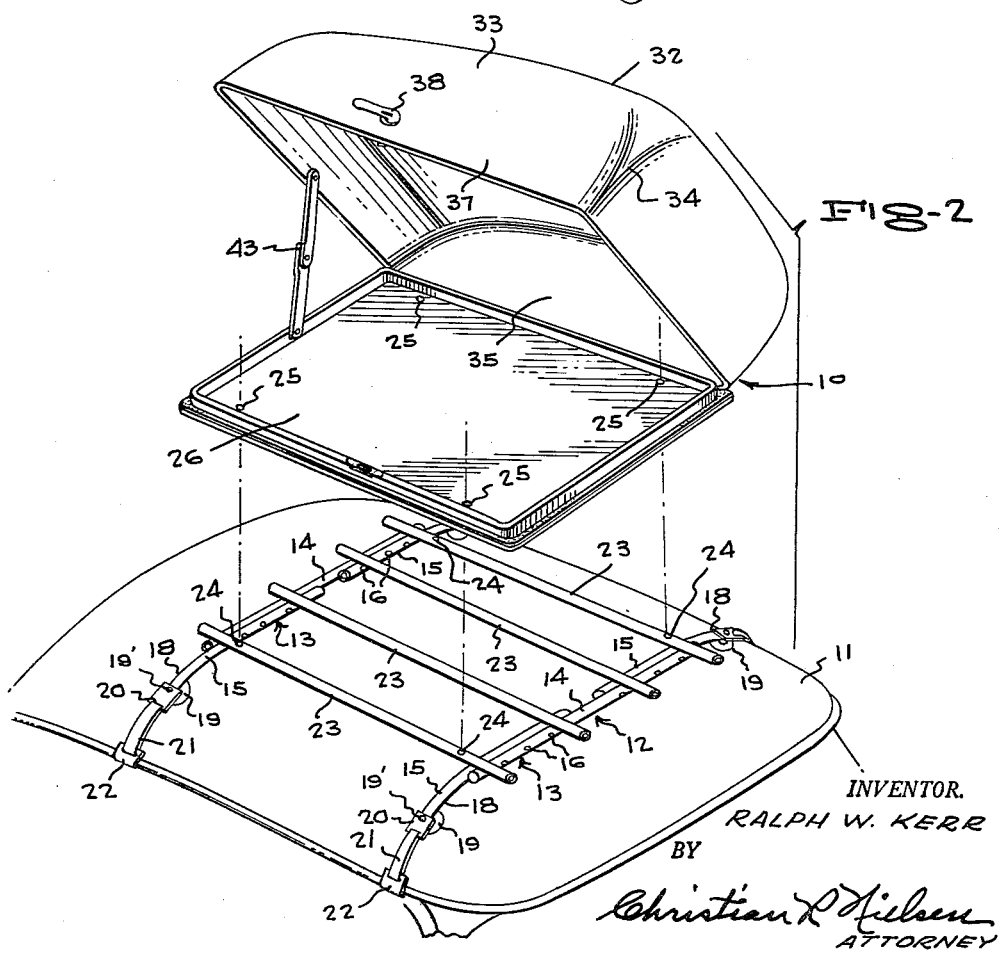
INVENTOR.
RALPH W. KERR
BY
Christian L. Nielsen
ATTORNEY June 25, 1963 R. W. KERR 3,095,129
CAR TOP TRUNK LUGGAGE CARRIER
Filed July 7, 1959 2 Sheets-Sheet 2
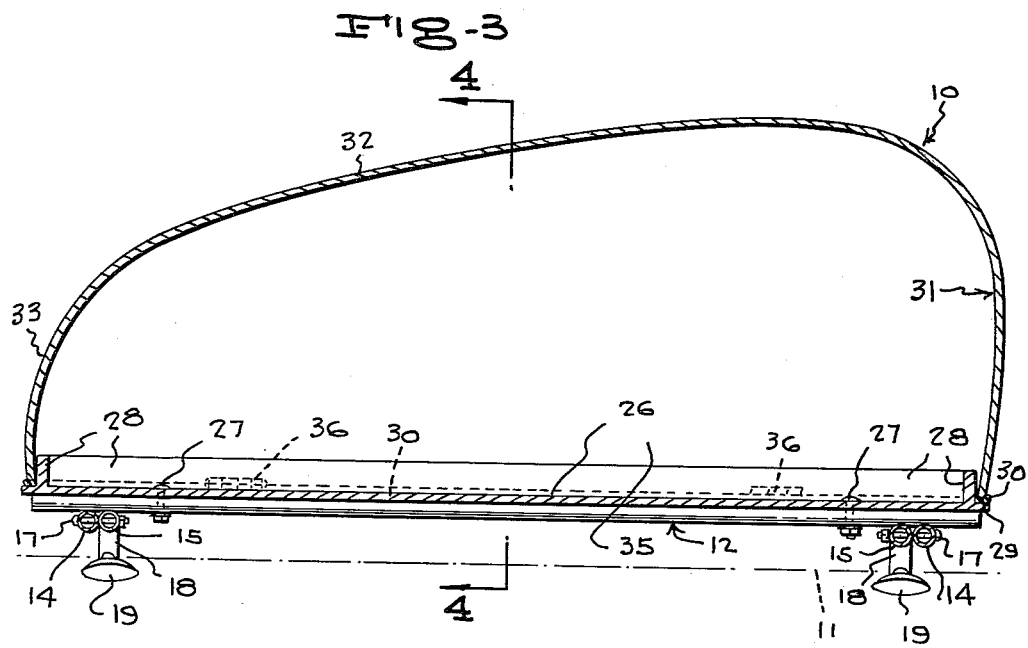
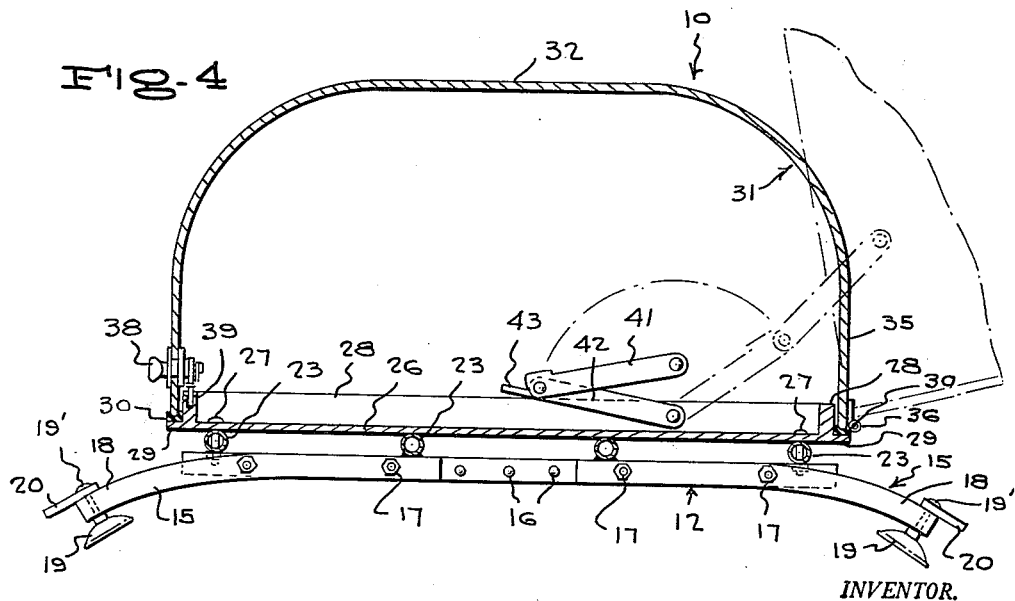
INVENTOR.
RALPH W. KERR
BY
Christian R. Nielsen
ATTORNEY

United States Patent Office 3,095,129
Patented June 25, 1963

3,095,129
CAR TOP TRUNK LUGGAGE CARRIER
Ralph W. Kerr, Bowman, N. Dak.
Filed July 7, 1959, Ser. No. 825,494
1 Claim. (Cl. 224—42.1)

This invention relates to a car top trunk luggage carrier and it consists in the constructions, arrangements and combinations herein described and claimed.

It is an important object of the invention to provide a top trunk luggage carrier wherein an adjustable foundation is employed for securement upon the top of a vehicle body for detachable support of the trunk luggage carrier, thus providing an accessory having a dual function.

More specifically, it is an object of the invention to provide a luggage carrier wherein a foundation for support and retention of a trunk is provided, said foundation being adjustable to various sizes and shapes of car tops and in which the trunk compartment is readily removable from the foundation to enable the transportation of articles such as a canoe, boat or other bulky articles which cannot be housed within the trunk compartment.

It is a further important object of the invention to provide a trunk compartment for support upon a foundation secured upon the roof of a car, which has an exterior contour to provide a streamline effect, reducing wind resistance and in which the interior structure is such as to provide a weather proof connection between the base of the trunk and a hinged cover therefor, so that all articles carried in the trunk will be fully protected against the weather and loss.

Additional objects, advantages and features of invention will be apparent from the following description, considered in conjunction with the accompanying drawings, wherein, FIGURE 1 is a perspective view of the luggage carrier installed upon the roof of a car.

FIGURE 2 is an exploded perspective view of the trunk compartment and foundation therefor as installed upon the roof of a car.

FIGURE 3 is a longitudinal section taken on the line 3—3 of FIGURE 1, and

FIGURE 4 is a cross section taken on the line 4—4 of FIGURE 3.

Referring more particularly to the drawings, there is shown a luggage carrier generally indicated by the reference character 10, constructed for securement upon a vehicle top 11.

As best seen in FIGURES 2, 3 and 4, the carrier 10 is constructed upon a foundation 12 and as clearly shown in FIGURE 2, the foundation comprises a pair of members or units 13 of identical construction, consisting of an intermediate member 14 and respective terminal members 15, the intermediate members and the terminal members being arranged in parallel contacting relation for a portion of their lengths and being provided with spaced openings 16 which when in registry may receive a fastening means such as a bolt and nut 17 for adjusting and securing the terminal members in adjusted position with respect to the intermediate member, which may be required so as to fit the tops of various makes of motor vehicles. The outer ends 18 of the terminal members 15 are formed with a curvature so as to properly present respective suction cups 19 upon the roof surface of a car top and at each end is provided with an open loop 20 which may be secured by a bolt 19' of the suction cup. The loop 20 receives a retaining strap 21 which includes a clip 22 for engaging beneath a beaded or rolled edge of the car top.

The members 13 are connected together in spaced relation by means of tubing or bars 23 which are welded or otherwise secured upon the intermediate members 14 and as clearly shown in FIGURE 2, the terminal members 15 are disposed upon the sides of the intermediate members 14. The two outermost tubes 23 are each formed with openings 24 adapted to register with respective openings 25 formed in a bottom wall 26 of the trunk compartment 10, as will be presently described. Any suitable fastening means 27 may be employed in conjunction with the openings 24 and 25 for detachably securing the carrier to the foundation 12.

The compartment 10 comprises the bottom wall 26 which may be of any desired dimensions and shape, which in the present instance, is shown as substantially rectangular, and inwardly of the outer edges thereof, a continuous upstanding flange 28 is provided, thus presenting a surface 29 exteriorly of the flange, upon which a suitable continuous weather strip member 30 is mounted. The strip 30 functions to provide a watertight seal for the lower edges of the cover 31.

The cover 31 is a hollow upstanding member and may be formed from any suitable material, such as plastics, aluminum, fiber glass or similar light weight, yet sturdy materials, the top wall 32 of which will have a downward curvature toward the rear end 33 of the compartment cover. The side, top and end walls of the compartment cover will be integrally formed and all walls will be suitably merged and rounded, as indicated at 34 to reduce wind resistance when the vehicle is in motion. The side wall 35 is hingedly connected to the bottom wall 26 as at 36 and the opposite side wall 37 is provided with a simple latch and key-operated lock 38 which is operative with a keeper 39 mounted in the flange 28.

A hinged bracket 40 which comprises a pair of hinged links 41 and 42 are connected between the flange 28 and a side wall of the top cover, so that when the top is raised to open position, the links 41 and 42 may be moved to a position beyond dead center of their pivotal connection to maintain the top in open position, a stop 43 limiting movement beyond the dead center point.

From the construction shown and described, it will be seen that the top is hinged at a side wall opposite the wall embodying the lock and by this arrangement, it will be seen that the trunk compartment can be opened for storage of luggage in the trunk from a side of a car, rather than from the rear thereof; and that the luggage when stored will be fully protected against the weather, as well as loss of any articles, since the circumscribing upstanding flange 28 and the sealing strip 30, together with the lower edges of the top form a positive and tight closure upon securement of the lock.

A situation may arise where the trunk compartment 10 is not required in the transport of bulky articles, and in such event, the compartment may be readily removed from the foundation 12, by merely removing the bolts and nuts or similar fastening means 27.

While I have shown and described a preferred form of the invention, this is by way of illustration only, and I consider as my own all such modifications in construction as fairly fall within the scope of the appended claim.

I claim:

In a car top trunk luggage carrier, a foundation comprising a pair of units of similar construction which each embodies an intermediate member and respective terminal members, the intermediate members and terminal members being arranged in parallel relation for a portion of their length, there being a plurality of spaced apart openings in said terminal members, securing elements extending through certain of said openings and engaging said intermediate members, the outer ends of said terminal members being curved and having suction cups connected thereto, loops affixed to said terminal members and said loops having straps connected thereto and said straps including clips for engaging the edge of a car top, and a plurality of spaced parallel bars arranged transversely with respect to said intermediate members and affixed thereto.

References Cited in the file of this patent

UNITED STATES PATENTS

| | | |
|---|---|---|
| 2,434,387 | Brandt | Jan. 13, 1948 |
| 2,596,860 | McCrory et al. | May 13, 1952 |
| 2,597,656 | Martin | May 20, 1952 |
| 2,782,972 | Binding | Feb. 26, 1957 |
| 2,789,743 | Waldman | Apr. 23, 1957 |
| 2,812,992 | Lysen | Nov. 12, 1957 |

FOREIGN PATENTS

| | | |
|---|---|---|
| 63,530 | France | Apr. 13, 1955 |
| | (Addition to No. 1,079,736) | |
| 782,775 | France | Mar. 25, 1935 |
| 1,142,611 | France | Apr. 1, 1957 |
| 1,158,913 | France | Feb. 3, 1958 |
| 497,112 | Canada | Oct. 27, 1953 |